United States Patent
Mutarelli et al.

(10) Patent No.: US 12,304,755 B2
(45) Date of Patent: May 20, 2025

(54) AUTOMATED ITEM PICKING SYSTEMS AND METHODS

(71) Applicant: Target Brands, Inc., Minneapolis, MN (US)

(72) Inventors: Gervasio Mutarelli, Minneapolis, MN (US); Ernesto Saldana Pena, Minneapolis, MN (US); Carlos Loza, Minneapolis, MN (US); Justin Feider, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 623 days.

(21) Appl. No.: 17/743,002

(22) Filed: May 12, 2022

(65) Prior Publication Data

US 2023/0020976 A1 Jan. 19, 2023

Related U.S. Application Data

(60) Provisional application No. 63/223,234, filed on Jul. 19, 2021.

(51) Int. Cl.
*B65G 61/00* (2006.01)
*B25J 9/00* (2006.01)
*B25J 9/16* (2006.01)
*B25J 15/06* (2006.01)

(52) U.S. Cl.
CPC ............ *B65G 61/00* (2013.01); *B25J 9/0084* (2013.01); *B25J 9/1697* (2013.01); *B25J 15/0666* (2013.01); *G05B 2219/45063* (2013.01)

(58) Field of Classification Search
CPC ..... B65G 61/00; B25J 9/1697; B25J 15/0666; B25J 9/0084; B25J 15/0616; G05B 2219/45063
See application file for complete search history.

(56) References Cited

U.S. PATENT DOCUMENTS

| | | | |
|---|---|---|---|
| 9,958,851 B2 | 5/2018 | Mattern et al. | |
| 10,222,206 B2 | 3/2019 | Kimoto et al. | |
| 10,696,494 B1 | 6/2020 | Diankov et al. | |
| 10,703,585 B2 | 7/2020 | Pankratov et al. | |
| 2013/0110280 A1 | 5/2013 | Folk | |
| 2016/0039550 A1* | 2/2016 | Boudreau | B25J 9/0051 53/446 |

(Continued)

FOREIGN PATENT DOCUMENTS

WO WO2014041318 3/2014

*Primary Examiner* — Thomas Randazzo
(74) *Attorney, Agent, or Firm* — Fish & Richardson P.C.

(57) ABSTRACT

This document describes systems and methods for enhancing the efficiencies of order fulfillment and inventory management processes. For example, this document describes automated robotic systems that can autonomously pick and place a particular quantity of desired items from a container that is storing the items. The autonomous robotic systems can thereby facilitate order fulfillment and inventory management processes in an efficient manner. In particular, the systems and methods described herein can greatly reduce the amount of time required for a human worker to pick orders. Accordingly, the efficiency of item picking processes, as measured by the number of line items picked per human labor hour for example, is greatly enhanced.

20 Claims, 8 Drawing Sheets

(56) References Cited

U.S. PATENT DOCUMENTS

| | | |
|---|---|---|
| 2019/0185267 A1 | 6/2019 | Mattern et al. |
| 2020/0171650 A1* | 6/2020 | Hallock ................... B25J 9/009 |
| 2021/0171295 A1* | 6/2021 | Azuma ................. B65G 67/08 |
| 2021/0179356 A1* | 6/2021 | Chen ......................... G06T 7/70 |

* cited by examiner

AUTOMATED ITEM PICKING SYSTEMS AND METHODS

CROSS-REFERENCE TO RELATED APPLICATIONS

This application claims the benefit of U.S. Provisional Application Ser. No. 63/223,234, filed Jul. 19, 2021. The disclosure of the prior application is considered part of (and is incorporated by reference in) the disclosure of this application.

TECHNICAL FIELD

This document relates to systems and methods for enhancing the efficiencies of order fulfillment and inventory management processes. For example, this document relates to robotic systems that can autonomously pick and place a particular quantity of desired items from a container that is storing the items. The autonomous robotic system can thereby facilitate order fulfillment and inventory management processes in an efficient manner

BACKGROUND

The ability to efficiently and accurately process customer orders (which includes both internal and external customer orders) has become an essential part of doing business. In general, order picking is one of the most labor intensive and expensive operations in many order processing warehouse operations. Accordingly, productivity gains from employing automation for order-picking processes are greatly desirable.

In many order-picking processes, items are homogenously stored in a container. In some cases, the items may be stored in the homogenous container in an organized fashion (e.g., in rows, columns, stacks, etc.). In some cases, the items may be stored in the homogenous container in a randomized fashion. In certain cases, items may be stored in a container in a mixed fashion. That is, items of one type may be stored in a container with items that are one or more different types of items. This can be referred to as mixed or heterogeneous item storage.

Various attempts have been made to use robots to automate the picking processes of items from both homogenous and heterogeneous storage containers. Automating the item picking processes from both homogenous and heterogeneous storage containers is particularly challenging.

SUMMARY

This document describes systems and methods for enhancing the efficiencies of order fulfillment and inventory management processes. For example, this document describes robotic systems that can autonomously pick and place a particular quantity of desired items from a container that is storing the items. The autonomous robotic system can thereby facilitate order fulfillment and inventory management processes in an efficient manner.

While the descriptors "container" or "receptacle" are used herein to refer to an item-carrying implement, it should be understood that "container" or "receptacle" represents any type of item-carrying implement such as, but not limited to, a bin, a box, a tote, a pallet, a carton, a rack, a shelf, a cart, a bag, a cage cart, and the like.

In one aspect, this disclosure is directed to an item picking system. As described below, such an item picking system can include a surface, a first item manipulation apparatus including a first end effector, and a second item manipulation apparatus including a second end effector. The first end effector can be configured to releasably couple with multiple items in a first item receptacle. The first item manipulation apparatus can be configured to transfer and release the multiple items coupled to the first end effector onto the surface. The second end effector can be configured to engage with a single item of the multiple items on the surface, and to transfer the single item into a second item receptacle.

Such an item picking system may optionally include one or more of the following features. The second end effector may be configured to lift the single item off of the surface. The second end effector may be configured to slide the single item across the surface. At least a portion of the surface onto which the first item manipulation apparatus releases the multiple items may be inclined. In some embodiments, the item picking system also includes a mechanism configured to vibrate the surface to cause separation of the multiple items on the surface. The item picking system may also include a mechanism configured to vibrate the first item receptacle. The first item manipulation apparatus may include a first vision system configured to visualize the multiple items in the first item receptacle. The second item manipulation apparatus may include a second vision system configured to visualize the single item of the multiple items on the surface. In some implementations, the first item manipulation apparatus is a first robot, and the second item manipulation apparatus is a second robot. Alternatively, in other implementations the first item manipulation apparatus and/or the second item manipulation apparatus is a customized electromechanical assembly that is especially configured for picking and placing items. In some embodiments, the first end effector is a vacuum end effector with multiple suction cups and level compensators. In some embodiments, the first end effector can have two different item interface portions (as described further below). In some such embodiments, the item picking system can utilize a single item manipulation apparatus (rather than requiring two item manipulation apparatuses).

In another aspect, this disclosure is directed to a method of item picking. The method of item picking may include: releasably coupling a first end effector of a first item manipulation apparatus to multiple items in a first item receptacle; transferring, by the first item manipulation apparatus, the multiple items coupled to the first end effector onto a surface; engaging a second end effector of a second item manipulation apparatus with a single item of the multiple items on the surface; and transferring, by the second manipulation apparatus, the single item engaged with the second end effector into a second item receptacle.

Such a method may optionally include one or more of the following features. The method may also include: after transferring the single item engaged with the second end effector into the second item receptacle, transferring, by the second manipulation apparatus, all remaining items of the multiple items on the surface to the first item receptacle. The transferring the single item engaged with the second end effector into the second item receptacle may be performed by lifting the single item off of the surface by the second end effector. The transferring the single item engaged with the second end effector into the second item receptacle may be performed by sliding the single item across the surface by the second end effector. In some embodiments, the method may also include vibrating the surface to cause separation of the multiple items on the surface. In particular embodiments, the method may include vibrating the first item receptacle prior to the releasably coupling the first end effector of the first item manipulation apparatus to multiple items in the first item receptacle. At least a portion of the surface onto which the first item manipulation apparatus transfers the multiple items may be inclined. The method may also include using a first vision system, by the first item manipulation apparatus, to visualize the multiple items in the first item receptacle. The method may also include using a second vision system, by the second item manipulation apparatus, to visualize the single item of the multiple items on the surface. Such a second vision system can also be used to visualize and determine occupied and/or open spaces in the second item receptacle to assist with the placement of items into the second item receptacle. In some implementations, the first item manipulation apparatus is a first robot, and the second item manipulation apparatus is a second robot. The first end effector may be a vacuum end effector with multiple suction cups and level compensators.

The systems and processes described here may be used to provide one or more of the following potential benefits. First, labor costs associated with warehouse operations and order fulfillment processes overall may be reduced using the automated systems and processes described herein. For example, the systems and processes described herein can function largely autonomously or semi-autonomously, thereby reducing the need for human involvement in the process of picking items from inventory, and/or for performing other inventory management processes such as physically counting inventory, and sorting and re-stowing to consolidate inventory storage. The lessened human involvement advantageously translates to lower operating costs. Second, the use of automation systems such as the autonomic robotic systems described herein can accelerate the speed of order fulfillment processes. Such reductions in cycle time for order fulfillment in some cases can facilitate quicker delivery of ordered items to customers, stores, and the like. Accordingly, customer satisfaction can be increased, and inventory-carrying costs can be decreased. Third, order fulfillment quality can be improved through automation by reducing the potential for human errors. Humans are statistically prone to a higher level of error than automation processes. In addition, such reductions in errors can enable an increase in inventory accuracy. Increased inventory accuracy can, in turn, lead to higher order fulfillment rates, lower levels of safety stock inventory, lessened requirements for manual inventory cycle counting, and the like.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing the efficiencies of order fulfillment and inventory management processes. For example, this document describes automated robotic systems that can autonomously pick and place a particular quantity of desired items from a container that is storing the items. The autonomous robotic systems can thereby facilitate order fulfillment and inventory management processes in an efficient manner.

In particular, the systems and methods described herein can greatly reduce the amount of time required for a human worker to pick orders. As described further below, robots take over many of the tasks related to picking items. Therefore, the need for human labor for item picking processes is reduced. Accordingly, while human workers may be able to pick items faster than the systems described herein, the efficiency of item picking processes, as measured by the number of line items picked per human labor hour for example, is greatly enhanced using the systems described herein.

For example, as described further below, in some embodiments such an item picking system can include a surface, a first item manipulation apparatus including a first end effector, and a second item manipulation apparatus including a second end effector. The first end effector can be configured to releasably couple with multiple items in a first item receptacle. The first item manipulation apparatus can be configured to transfer and release the multiple items coupled to the first end effector onto the surface. The second end effector can be configured to engage with a single item of the multiple items on the surface, and to transfer the single item into a second item receptacle.

Figure 1:
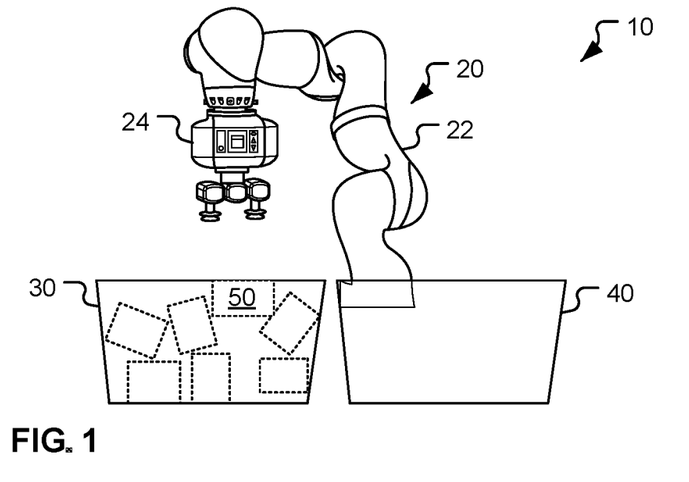
FIG. 1 illustrates a first step of a first example item picking scenario. A robotic apparatus is preparing to engage with a selected item from within a storage container holding multiple items.
Figure 2:
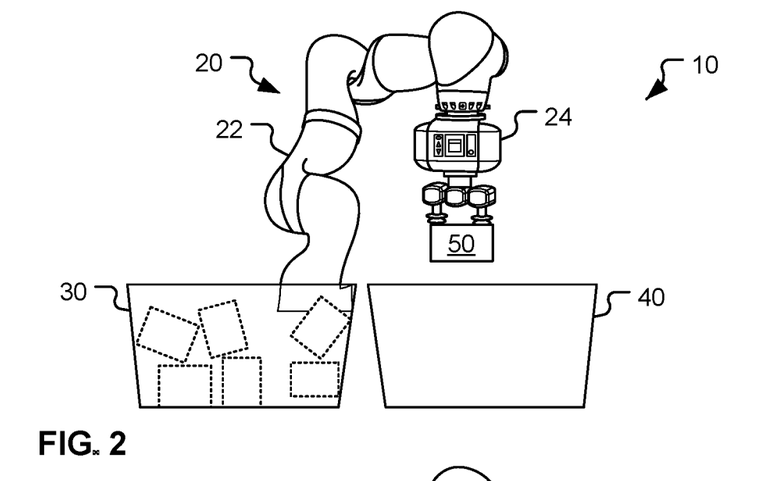
FIG. 2 illustrates a second step of the first example item picking scenario. Here, the robotic apparatus has engaged with the selected item from the storage container and is transferring the item toward a second container.
Figure 3:
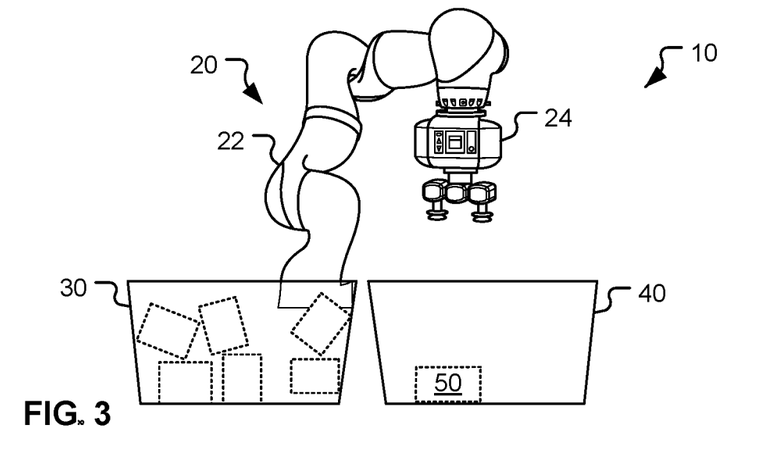
FIG. 3 illustrates a third step of the first example item picking scenario. Here, the robotic apparatus has placed the selected item in the second container.

Referring to FIGS. 1-3, an example autonomous item picking system 10 can be used in an environment such as, but not limited to, a warehouse. As used herein, the term "warehouse" is representative of a variety of different types of facilities such as, but not limited to, flow centers, distribution centers, inventory storing locations, order fulfillment centers, receive centers, stores, cross-docking facilities, material handling facilities, and the like, and combinations thereof. In this disclosure, the term "warehouse" may be used to refer to any and all such different types of facilities, and combinations thereof.

In the depicted example scenario, the autonomous item picking system 100 is performing an item picking process to obtain one or more desired items to fulfill an order for the one or more desired items. That is, the autonomous item picking system 10 is engaging with (or "picking") a first single item 50 from a storage container 30 and transferring (or "placing") the first single item 50 into a second container 40 (which can be a shipping container in some examples). Such an order for the one or more desired items can be in response to a demand for the one or more desired items from variety of different entities such as, but not limited to, individual consumers, retail stores (e.g., for stock replenishment), business partners, other warehouse facilities, and the like.

The example autonomous item picking system 10 includes the storage container 30 containing the multiple items 50, the second container 40 for receiving one or more of the items 50, and a programmable/controllable item manipulation apparatus 20. In the depicted example, the item manipulation apparatus 20 includes a programmable/controllable robotic apparatus 22 (or more simply "robot 22") and an end effector 24. The end effector 24 is attached to and positionally manipulated in three dimensions by the robot 22.

In the depicted example, the end effector 24 includes one or more vacuum actuated suction cups that can releasably engage with a single one of the items 50. In some embodiments, the end effector 24 can be a grasping mechanism, or another type of end effector.

While in the depicted embodiment the item manipulation apparatus 20 includes the robot 22. In some embodiments, rather than the robot 22, the item manipulation apparatus 20 includes a customized mechanical assembly that is specifically designed for picking/placing operations.

The storage container 30 contains the multiple items 50. In some embodiments, the multiple items 50 are all the same type of item. In other words, the storage container 30 can be a homogenous storage container. Alternatively, in some embodiments the multiple items 50 can be two or more differing types of items. In other words, in some embodiments the storage container 30 can be a mixed container or a heterogeneous container. The multiple items 50 can be randomly orientated in the storage container 30 or can be positioned within the storage container 30 in an organized fashion (e.g., in rows, stacks, etc.).

Referring to FIG. 1, in some embodiments the item manipulation apparatus 20 can include a vision system, such as a two-dimensional or a three-dimensional vision system. Accordingly, the item manipulation apparatus 20 can identify a position and orientation of the item 50 to be picked from within the storage container 30. With that information, a control system (e.g., a control system of the item manipulation apparatus 20, or a separate control system) can plan a pathway for moving the end effector 24 into a position in which it can engage the item 50.

Referring to FIGS. 2 and 3, after the item manipulation apparatus 20 has engaged with the item 50 from the storage container 30, then the item manipulation apparatus 20 can transfer the item to the second container 40. After that, if an additional one or more of the items 50 from the storage container 30 is/are also needed to be placed into the second container 40, then the process described above can be repeated to obtain the additional one or more items 50.

While the pick and place operation depicted in FIGS. 1-3 is described above as a relatively straight-forward process, in fact the pick and place operation can, in actual reality, be quite difficult for the autonomous item picking system 10 to consistently successfully perform. First, a single one of the items 50 from within the storage container 30 needs to be visually identified by the item manipulation apparatus 20. Then, the physical orientation of the single item 50 within the storage container 30 must be determined by the item manipulation apparatus 20. These steps can be difficult for vision systems to perform in a repeatably successful manner. Second, even if the physical orientation of the single item 50 is properly determined, then the robot 22 must orient and position the end effector 24 in a manner in which the end effector 24 can successfully engage with the item 50. This can be particularly difficult for the item manipulation apparatus 20 to perform when the item 50 within the storage container 30 is randomly orientated and the storage container 30 contains multiple items 50 that are randomly orientated. Accordingly, the pick and place operation depicted in FIGS. 1-3 is sometimes not a greatly reliable process for all types of items for all situations.

In addition, another important element that can help the process described above to work (even though the process may not be very efficient) is artificial intelligence ("AI"). Most of current traditional 3D bin picking systems have an AI engine to provide the information to the robot to where to pick each item from. AI can be used to detect any kind of element that never has been seen and/or been able to pick. However, the variability of 3D orientations of items in a container is much larger of 2D orientations when items are on a surface (e.g., as described in the systems below). AI may still be needed in the systems described below, but the training time (learning curve) to pick new items is reduced.

FIGS. 4-16 depict another example autonomous item picking system 100. Here again, as with the autonomous item picking system 10 described above, an example purpose of the autonomous item picking system 100 is to pick and place one or more items 50 from the storage container 30 to the second container 40. However, the autonomous item picking system 100 is designed with technical improvements that address some or all of the technical challenges related to the autonomous item picking system 10, as described above.

FIGS. 4-16 are a sequential series of illustrations that depict the picking and placing of two of the items 50. That is, the example depicted in FIGS. 4-16 is what the autonomous item picking system 100 would do in response to an order to put two of the items 50 in the second container 50. Of course, the concepts illustrated and described are also applicable to picking and placing other quantities of the items 50, including one, three, four, five, six and so on.

The autonomous item picking system 100 includes a first item manipulation apparatus 20a, a second item manipulation apparatus 20b, and a surface 110. The first item manipulation apparatus 20a includes a first end effector 26. The second item manipulation apparatus 20b includes a second end effector 24. As with the item manipulation apparatus 20 described above, the first item manipulation apparatus 20a and/or the second item manipulation apparatus 20b can be a robotic system or an electro-mechanical assembly that is designed or adapted for picking and placing items.

In the depicted embodiment, the second end effector 24 can be the same type of end effector as the end effector 24 described above in reference to the autonomous item picking system 10. That is, in general the second end effector 24 is configured to releasably engage with a single one of the items 50 at a time.

The first end effector 26 is different than the second end effector 24 in that the first end effector 26 is configured to releasably engage with one or more of the items 50 at a time. In some embodiments, the first end effector 26 includes multiple suction cup devices that are distributed over an area that is equal to or larger than an area of two or more of the items 50. Accordingly, the first end effector 26 is configured to releasably engage with multiple items 50 at a time. More specifically, in some embodiments the first end effector 26 is configured to releasably engage with a layer of the items 50 that are in the storage container 30. For example, the first end effector 26 is configured to releasably engage with a top layer of the items 50 that are in the storage container 30. In some embodiments, the multiple suction cups of the first end effector 26 are configured with independent suspension systems (e.g., level compensators) that permit the suction cups of the first end effector 26 to reach multiple items 50 that are located at differing elevations within the storage container 30.

Figure 4:
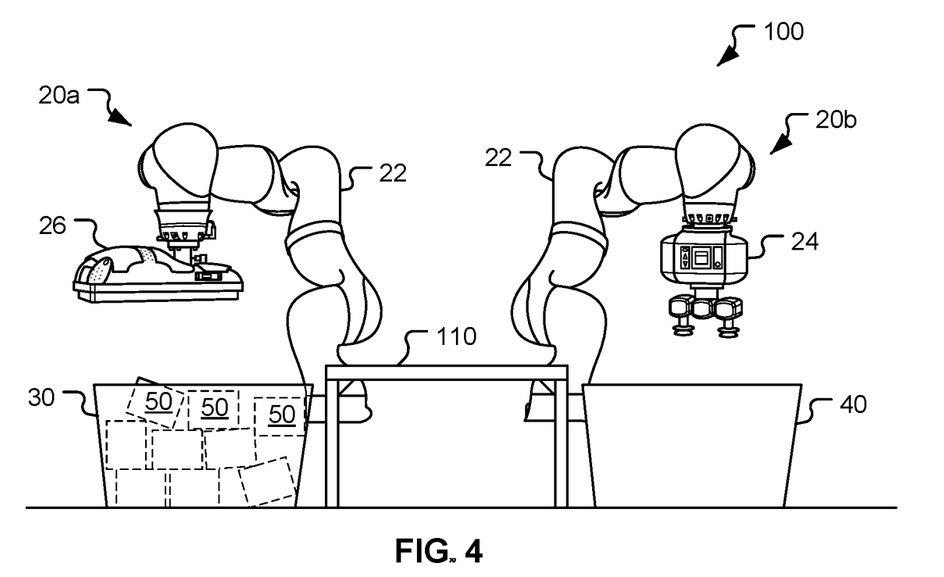
FIG. 4 illustrates a first step of a second example item picking scenario. A first robotic apparatus is preparing to engage with a top layer of items from within a storage container holding multiple items.

Referring in particular to FIG. 4, here the first item manipulation apparatus 20a is depicted as visualizing the items 50 (e.g., the top layer of the items 50) within the storage container 30. The first item manipulation apparatus 20a may be equipped with a two-dimensional or three-dimensional vision system in such a case.

Next, in some embodiments, the control system of the first item manipulation apparatus 20a calculates and plans a path to approach the items 50 using the first end effector 26.

However, such visualization and/or path calculation and planning are optional steps. In particular embodiments, no such visualization and/or path calculation/planning is needed, or only minimal visualization and/or path calculation/planning is needed. That is the case because the concept being employed here for picking the items 50 is simply for the first end effector 26 that has a relatively large footprint area to engage with multiple items 50, such as a top layer of the items 50. Accordingly, in some embodiments the first end effector 26 is simply lowered into the storage container 30 so that the first end effector 26 will engage with whatever items 50 are thereby engageable. This reduces or eliminates the technical challenges involved with visualization and path calculation associated with trying to engage with a single one of the items 50 from the storage container 30 as described above in reference to the autonomous item picking system 10.

In some embodiments, the autonomous item picking system 100 includes a vibration generator mechanism that is configured to vibrate the storage container 30. The application of vibrations to the storage container 30 can help, in some cases, to level and/or separate the top layer of the items 50 in the storage container 30.

Figure 5:
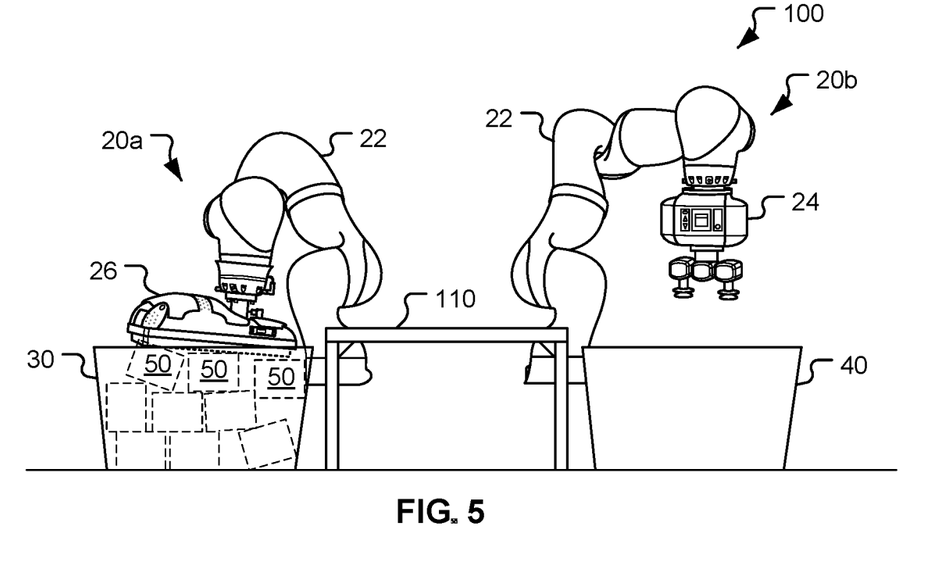
FIG. 5 illustrates a second step of the second example item picking scenario. Here, the first robotic apparatus is engaging with the top layer of items.

FIG. 5 shows the first item manipulation apparatus 20a after having moved the first end effector 26 in contact with top layer of the items 50 in the storage container 30. The multiple suction cups of the first end effector 26 can have independent suspension systems that permit the vacuum suction cups of the first end effector 26 to reach multiple items 50 that are located at differing elevations within the storage container 30. Accordingly, the first end effector 26 can engage with the top layer of the items 50 (in this example there are three of the items 50 on the top layer).

Figure 6:
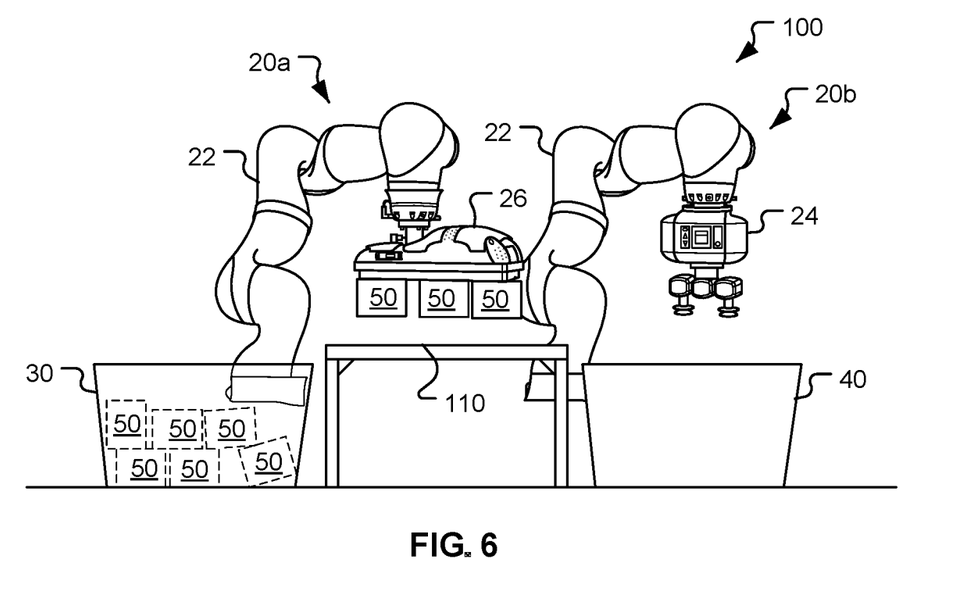
FIG. 6 illustrates a third step of the second example item picking scenario. Here, the first robotic apparatus is placing on a surface the top layer of items that were picked from the storage container.

FIG. 6 shows the first item manipulation apparatus 20a after engaging the first end effector 26 with the top layer of the items 50 in the storage container 30. In addition, the first item manipulation apparatus 20a has moved the first end effector 26 that is engaged with the top layer of the items 50 toward the surface 110.

Figure 7:
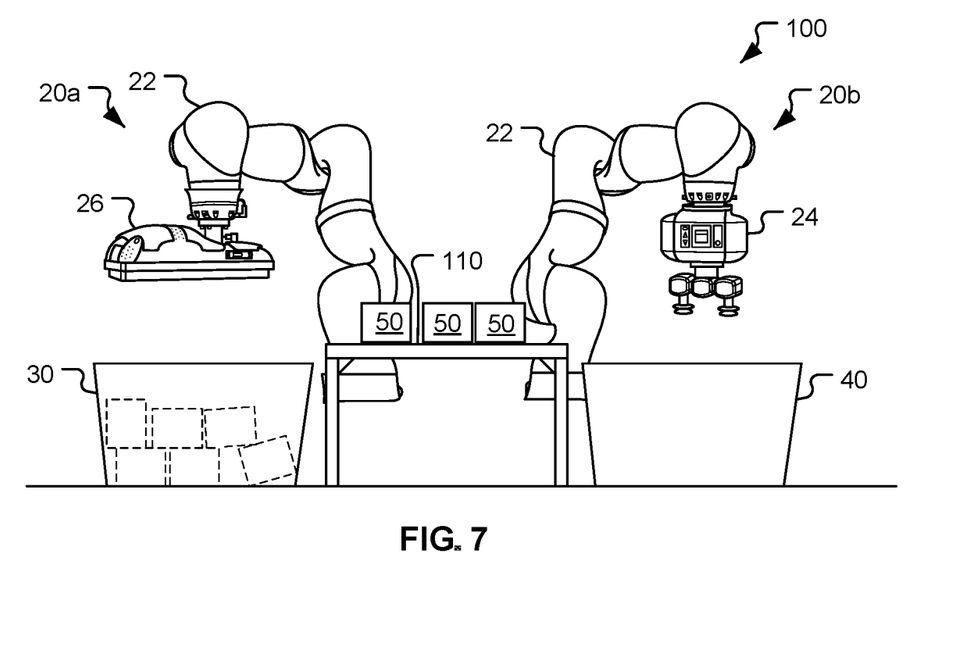
FIG. 7 illustrates a fourth step of the second example item picking scenario. Here, the top layer of items that were picked from the storage container are shown resting on the surface.

FIG. 7 shows the autonomous item picking system 100 after the first item manipulation apparatus 20a has placed the top layer of the items 50 on the surface 110.

In some embodiments, the surface 110 is simply a flat, level, planar surface (like a table top). Optionally, in some embodiments the surface 110 can have one or more features that can serve to encourage separation of the items 50 on the surface 110. For example, in some embodiments portions or all of the surface 110 can be inclined. Accordingly, when the first item manipulation apparatus 20a places the top layer of the items 50 on the surface 110, the items 50 may encounter the incline(s) and be encouraged to separate from each other. In particular embodiments, portions or all of the surface 110 can be configured to vibrate to encourage the items 50 to separate from each other. In some embodiments, portions of the surface 110 can move (e.g., spin or translate) to encourage the items 50 to separate from each other.

Figure 8:
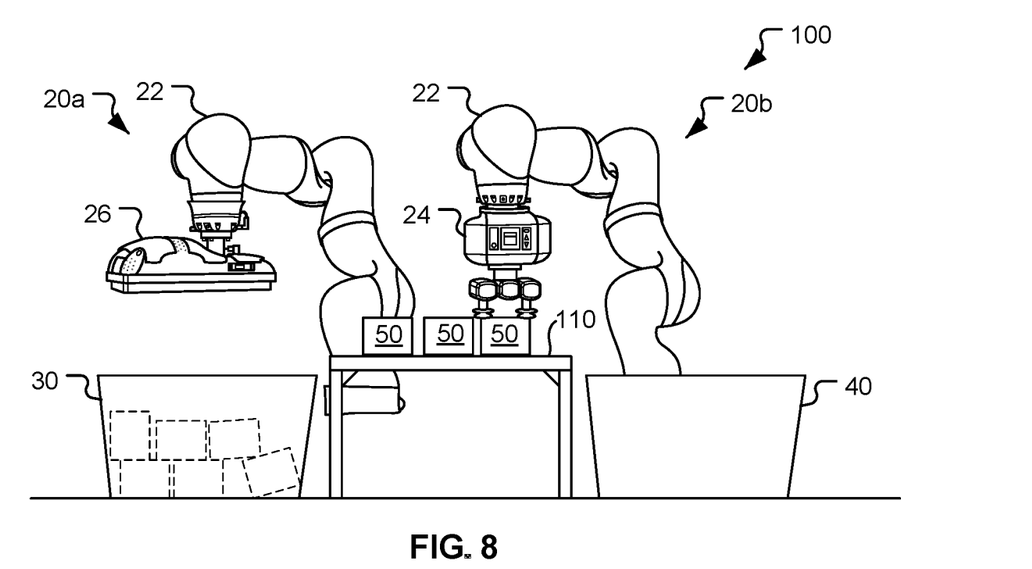
FIG. 8 illustrates a fifth step of the second example item picking scenario. Here, a second robotic apparatus is engaging with a first single item from the items that are resting on the surface.

FIG. 8 shows the second item manipulation apparatus 20b using its second end effector 24 to engage with a first single item 50 from on the surface 110. In this example, the second end effector 24 uses vacuum to engage with the item 50. However, other types of end effectors can also be used, such as graspers, magnets, pushers, etc.

Figure 9:
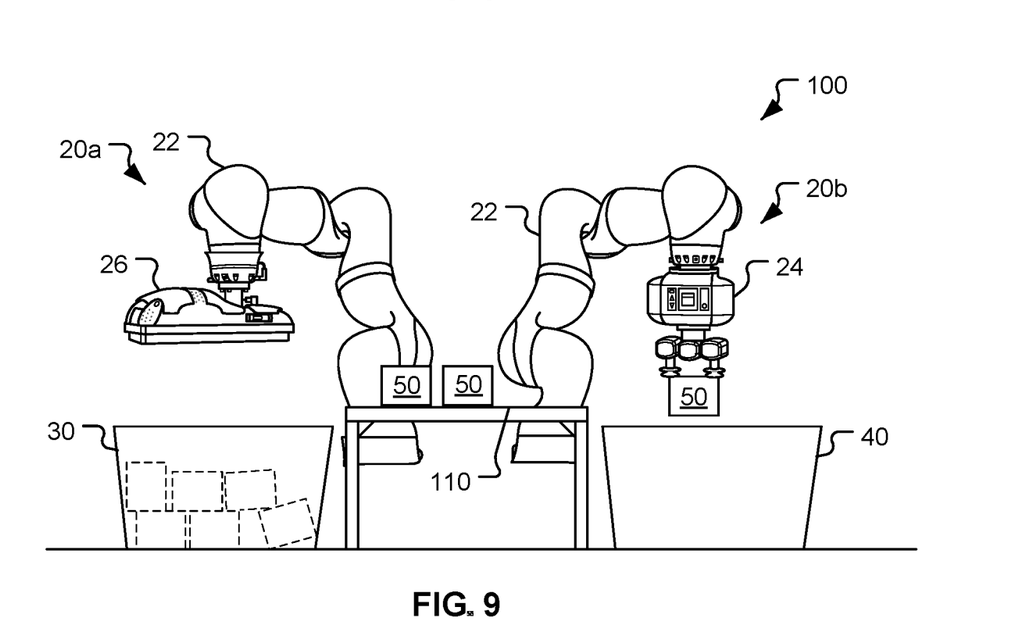
FIG. 9 illustrates a sixth step of the second example item picking scenario. Here, the second robotic apparatus is transferring the first single item from the surface toward a second container.

FIG. 9 shows the second item manipulation apparatus 20b using its second end effector 24 to transfer the single item 50 towards the second container 40. While this example shows the second end effector 24 transferring the single item 50 by lifting the item 50, in some embodiments the second end effector 24 simply pushes or drags the item 50 along the surface 110 and then off the surface 110 so that the item 50 falls into the second container 40.

Figure 10:
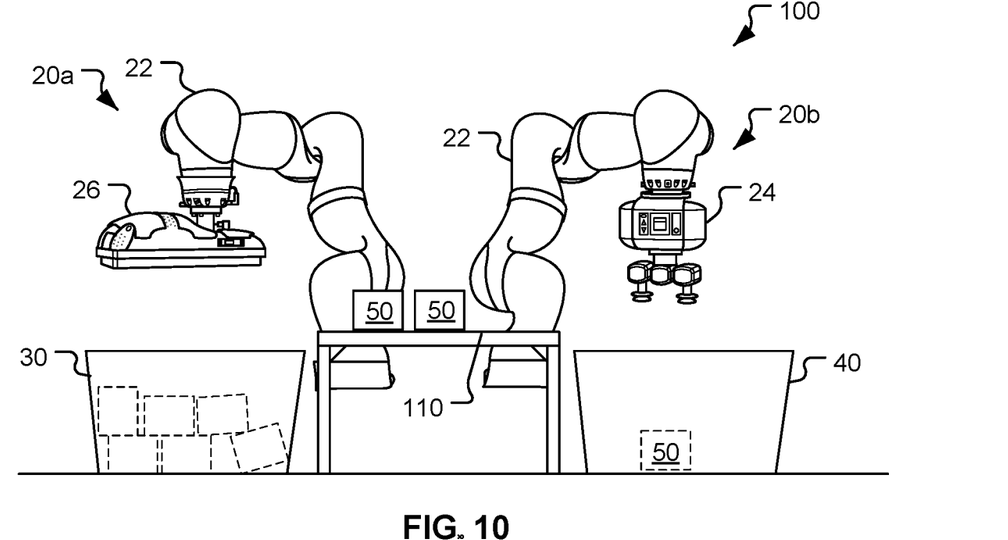
FIG. 10 illustrates a seventh step of the second example item picking scenario. Here, the second robotic apparatus has placed the first single item into the second container.

FIG. 10 shows the single item 50 in the second container 40 after being placed there by the second item manipulation apparatus 20b. As mentioned above, FIGS. 4-16 are depicting an example method/process that involves the placement of two of the items 50 into the second container 40. Therefore, a second item 50 is still needed to be placed into the second container 40.

Figure 11:
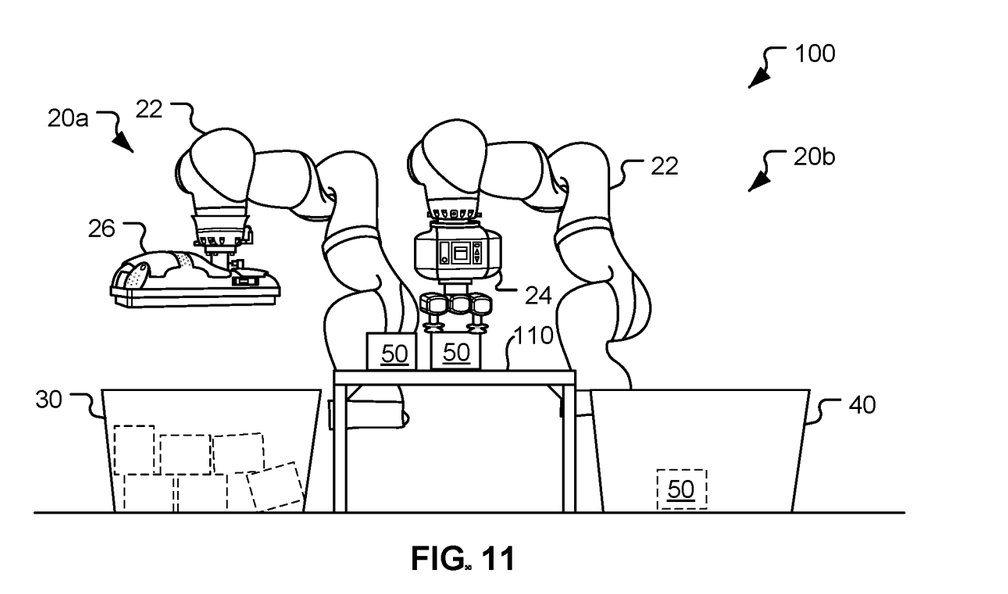
FIG. 11 illustrates an eighth step of the second example item picking scenario. Here, the second robotic apparatus engaging with a second single item from the items that are resting on the surface.

FIG. 11 shows the second item manipulation apparatus 20b using its second end effector 24 to engage with a second single item 50 from on the surface 110.

Figure 12:
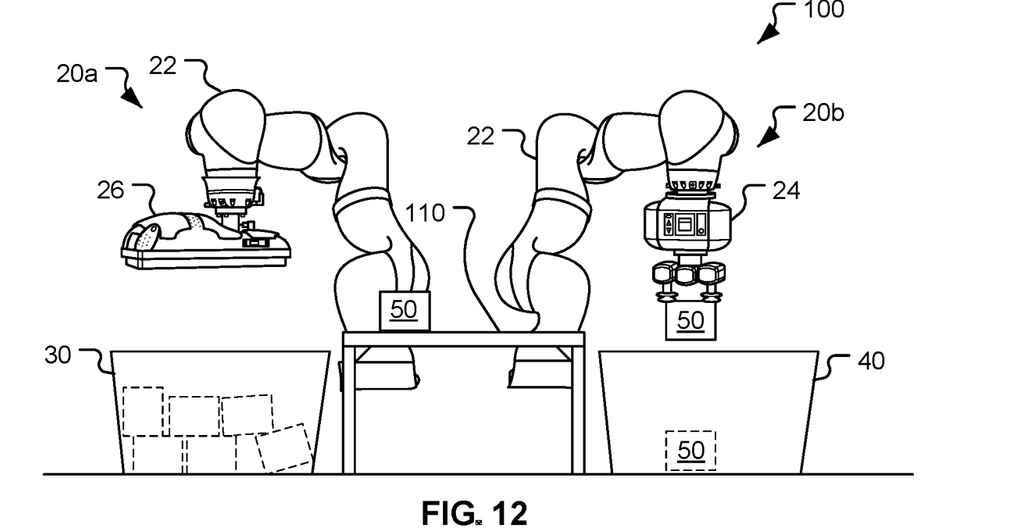
FIG. 12 illustrates a ninth step of the second example item picking scenario. Here, the second robotic apparatus is transferring the second single item from the surface toward the second container.

FIG. 12 shows the second item manipulation apparatus 20b using its second end effector 24 to transfer the second single item 50 towards the second container 40. While this example shows the second end effector 24 transferring the second single item 50 by lifting the item 50, in some embodiments the second end effector 24 simply pushes or drags the item 50 along the surface 110 and then off the surface 110 so that the second single item 50 falls into the second container 40.

Figure 13:
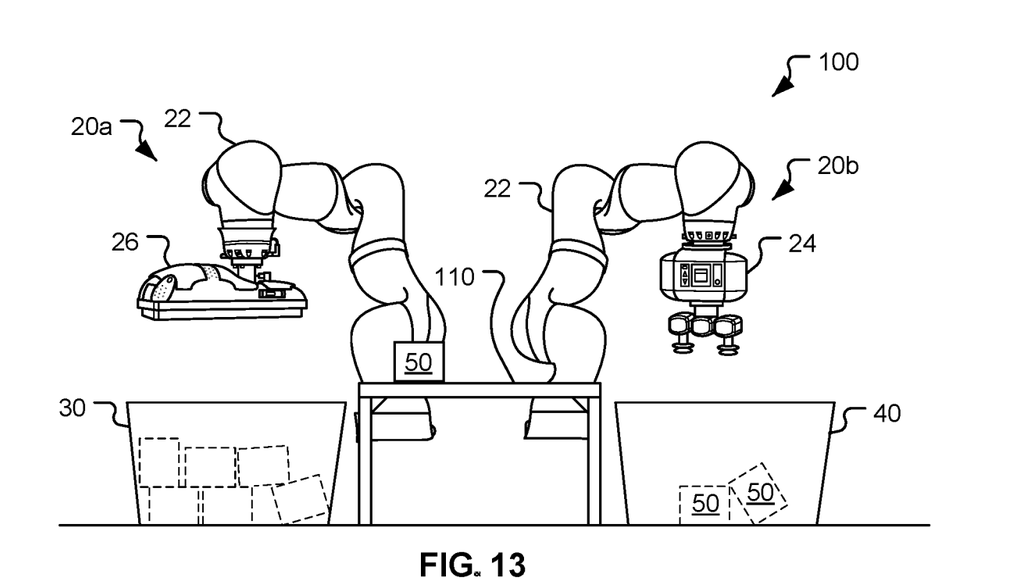
FIG. 13 illustrates a tenth step of the second example item picking scenario. Here, the second robotic apparatus has placed the second single item into the second container.

FIG. 13 shows the second single item 50 in the second container 40 after being placed there by the second item manipulation apparatus 20b. Accordingly, at this point in the method/process, the second container 40 is holding two of the items 50. This completes the requirements of the example order for the two items 50 to be placed in the second container 40.

The third single item 50 is still located on the surface 110. The third single item 50 is not needed or intended to be placed into the second container 40. Accordingly, the third single item 50 can be returned to the storage container 30.

Figure 14:
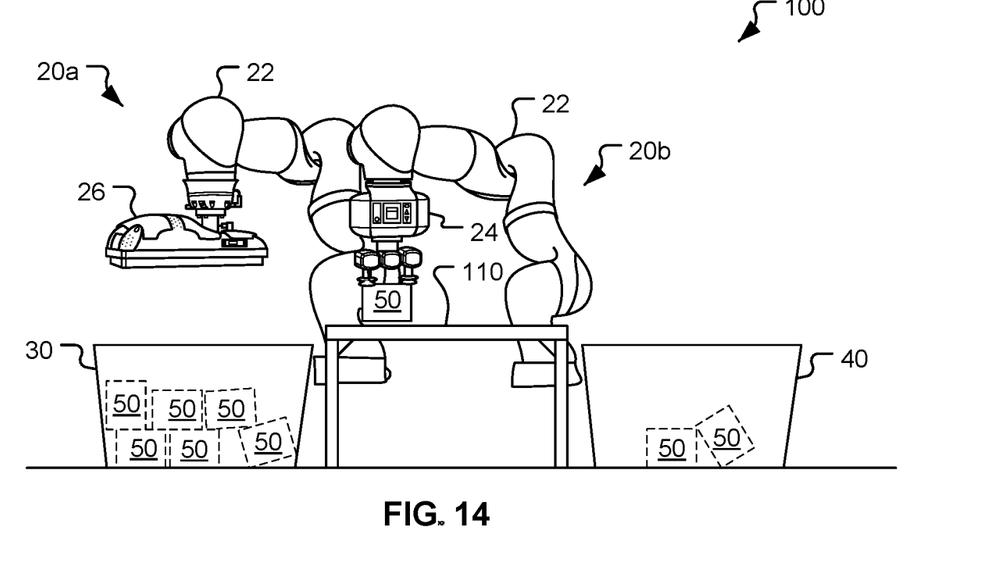
FIG. 14 illustrates an eleventh step of the second example item picking scenario. Here, the second robotic apparatus is engaging with a third single item from the items that are resting on the surface.

FIG. 14 shows the second item manipulation apparatus 20b using its second end effector 24 to engage with the third single item 50 from on the surface 110.

Figure 15:
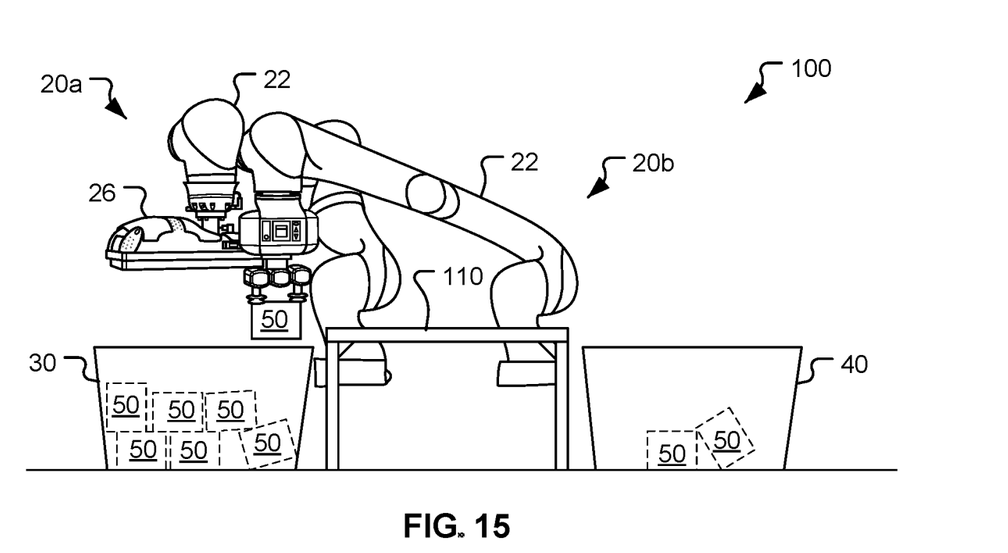
FIG. 15 illustrates a twelfth step of the second example item picking scenario. Here, the second robotic apparatus is transferring the third single item from the surface back toward the storage container.

FIG. 15 shows the second item manipulation apparatus 20b using its second end effector 24 to transfer the third single item 50 towards the storage container 30. While this example shows the second end effector 24 transferring the third single item 50 by lifting the item 50, in some embodiments the second end effector 24 simply pushes or drags the item 50 along the surface 110 and then off the surface 110 so that the third single item 50 falls into the storage container 30. In some embodiments, the first item manipulation apparatus 20a can perform this step rather than the second item manipulation apparatus 20b.

Figure 16:
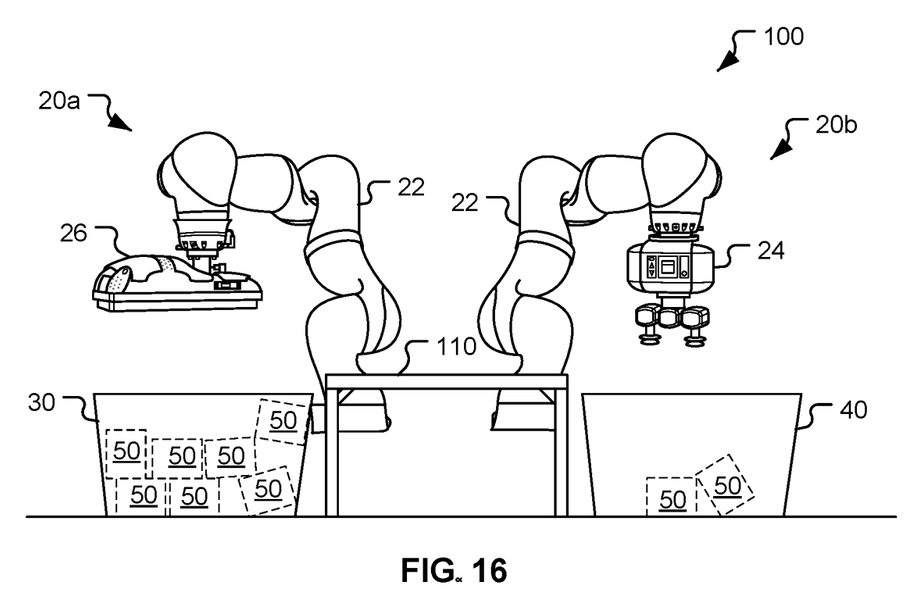
FIG. 16 illustrates a thirteenth step of the second example item picking scenario. Here, the second robotic apparatus has transferred the third single item back into the storage container.

FIG. 16 shows the completion of the example method/process for transferring two of the items 50 from the storage container 30 to the second container 40. The second container 40 is holding two of the items 50, and the third single item 50 has been returned to the storage container 30. None of the items 50 are remaining on the surface 110.

From this point, in some scenarios the storage container 30 can be removed from its location (e.g., by a conveyor or mobile robot) and another storage container that is holding a different type of item can be moved into the location. In such a case, one or more of the different type of items can then be transferred to the second container 40 (if the order(s) for the items specifies that the one or more of the different type of items should be put in the second container along with the two items 50).

Additional Optional Features and Embodiments

In some embodiments, the autonomous or semi-autonomous item picking systems described herein also include a vision system and/or other types of sensors. Such a vision system can be used for various purposes such as to facilitate the picking up and placing down of the item or SKU containers by the item manipulation apparatus 22 (e.g., articulating robot 22).

In some embodiments, the autonomous or semi-autonomous item picking systems described herein can have or use various types of end effectors with which to interface with item containers. The end effectors can be clamping devices, suction devices, forks, and combinations thereof, to provide a few examples.

In some embodiments, the autonomous or semi-autonomous item picking systems described herein can include the capability to autonomously change end effectors. In some such embodiments, the autonomous or semi-autonomous item picking systems described herein can include an end effector changing station on the platform of the autonomous or semi-autonomous item picking system.

While the item picking system described above includes the use of two item picking apparatuses, in some embodiments a single item picking apparatus is used. For example, in some embodiments a single item picking apparatus can include a dual-function end effector. Such a dual-function end effector can include the functionality of both the first end effector 26 and the second end effector 24. In other words, in some cases a single dual-function end effector can convert (e.g., by a pivoting motion of the end effector) from actively using just the first end effector 26 to actively using just the second end effector 24 (and vice versa). In such a case, only one item picking apparatus is needed to perform the functions of the item picking system having the dual item picking apparatuses described above.

In another embodiment, an item picking system can include a single item picking apparatus along with a vision system and automation of the surface. For example, in some such embodiments the single item picking apparatus can pick a layer of items from a first item container and then place the items on the surface (e.g., as described above). Then, the vision system can be used to obtain a count of the number of the items that were placed on the surface. If the number of items on the surface is equal to the desired number of items to be placed in a second item container, then the surface can be actuated to automatically tilt to cause the items on the surface to slide into the second item container. If the number of items on the surface is less than the desired number of items to be placed in a second item container, then the surface can automatically tilt to cause the items to slide into the second item container, and then the single item picking apparatus can pick another layer of items from the first item container and then place the items on the surface. Whenever the surface has more items than the desired number of items to be placed in the second item container, then the single item picking apparatus can return the appropriate number of items from the surface to the first item container. Then the table can tilt to cause the remaining items on the surface to slide into the second item container. In some embodiments, rather than having the surface tile to slide the items, an arm or pusher-mechanism can be used to transfer the items on the surface into the second item container. This example can advantageously use a two-dimensional vision system that is less sophisticated and more reliable than a three-dimensional vision system that is typically required for picking items from a container.

While the functionality of the autonomous or semi-autonomous item picking systems described herein is described above in the context of picking a desired item from a homogenous storage container, it should be understood that the autonomous or semi-autonomous item picking systems can also perform such a process from a mixed or heterogeneous item storage container.

In some embodiments the autonomous or semi-autonomous item picking systems can be used to autonomously or semi-autonomously sort item inventory and consolidate the inventory so as to organize and reduce inventory storage space. That is, items can be picked from a mixed inventory storage container, identified, and then re-stowed back into storage in an enhanced manner according to the desired inventory management practices of the warehouse.

Another example use for the autonomous or semi-autonomous item picking systems described herein is for quality control checks of inventory accuracy. Essentially, the autonomous or semi-autonomous item picking systems described herein can autonomously perform inventory counts or cycle counts so as to ascertain an accurate count of items that are stored in inventory.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in control systems using digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

What is claimed is:

1. An item picking system, comprising:
   a surface;
   a first item manipulation apparatus including a first end effector, the first end effector configured to releasably couple with multiple items in a first item container, the first item manipulation apparatus configured to transfer and release the multiple items coupled to the first end effector onto the surface; and
   a second item manipulation apparatus including a second end effector, the second end effector configured to engage with a single item of the multiple items on the surface and to transfer the single item into a second item container.

2. The item picking system of claim 1, wherein the second end effector is configured to lift the single item off of the surface.

3. The item picking system of claim 1, wherein the second end effector is configured to slide the single item across the surface.

4. The item picking system of claim 1, wherein at least a portion of the surface onto which the first item manipulation apparatus releases the multiple items is inclined.

5. The item picking system of claim 1, further comprising a mechanism configured to vibrate the surface to cause separation of the multiple items on the surface.

6. The item picking system of claim 1, further comprising a mechanism configured to vibrate the first item container.

7. The item picking system of claim 1, wherein the first item manipulation apparatus includes a first vision system configured to visualize the multiple items in the first item container.

8. The item picking system of claim 1, wherein the second item manipulation apparatus includes a second vision system configured to visualize the single item of the multiple items on the surface.

9. The item picking system of claim 1, wherein the first item manipulation apparatus comprises a first robot, and wherein the second item manipulation apparatus comprises a second robot.

10. The item picking system of claim 1, wherein the first end effector is a vacuum end effector with multiple suction cups and level compensators.

11. A method of item picking, the method comprising:
    releasably coupling a first end effector of a first item manipulation apparatus to multiple items in a first item container;
    transferring, by the first item manipulation apparatus, the multiple items coupled to the first end effector onto a surface;
    engaging a second end effector of a second item manipulation apparatus with a single item of the multiple items on the surface; and
    transferring, by the second manipulation apparatus, the single item engaged with the second end effector into a second item container.

12. The method of claim 11, further comprising:
    after transferring the single item engaged with the second end effector into the second item container, transferring, by the second manipulation apparatus, all remaining items of the multiple items on the surface to the first item container.

13. The method of claim 11, wherein the transferring the single item engaged with the second end effector into the second item container comprises lifting the single item off of the surface by the second end effector.

14. The method of claim 11, wherein the transferring the single item engaged with the second end effector into the second item container comprises sliding the single item across the surface by the second end effector.

15. The method of claim 11, further comprising vibrating the surface to cause separation of the multiple items on the surface.

16. The method of claim 11, further comprising vibrating the first item container prior to the releasably coupling the first end effector of the first item manipulation apparatus to multiple items in the first item container.

17. The method of claim 11, wherein at least a portion of the surface onto which the first item manipulation apparatus transfers the multiple items is inclined.

18. The method of claim 11, further comprising using a first vision system, by the first item manipulation apparatus, to visualize the multiple items in the first item container.

19. The method of claim 11, further comprising using a second vision system, by the second item manipulation apparatus, to visualize the single item of the multiple items on the surface.

20. The method of claim 11, wherein the first item manipulation apparatus is a first robot, wherein the second item manipulation apparatus is a second robot, and wherein the first end effector is a vacuum end effector with multiple suction cups and level compensators.

\* \* \* \* \*